United States Patent
Jones et al.

(10) Patent No.: US 7,431,109 B2
(45) Date of Patent: Oct. 7, 2008

(54) POWER SUPPLY ASSEMBLY FOR MOTORIZED VEHICLES

(75) Inventors: Colburn L. Jones, West Pittston, PA (US); James M. Kosco, West Wyoming, PA (US); Mark A. Goodell, Thornhurst, PA (US)

(73) Assignee: Pride Mobility Products Corporation, Exeter, PA (US)

( * ) Notice: Subject to any disclaimer, the term of this patent is extended or adjusted under 35 U.S.C. 154(b) by 279 days.

(21) Appl. No.: 10/960,800

(22) Filed: Oct. 7, 2004

(65) Prior Publication Data

US 2005/0161276 A1    Jul. 28, 2005

Related U.S. Application Data

(60) Provisional application No. 60/509,491, filed on Oct. 8, 2003.

(51) Int. Cl.
*B60K 1/04* (2006.01)

(52) U.S. Cl. ............... 180/65.1; 180/68.5; 180/907; 180/908

(58) Field of Classification Search ............... 180/65.1, 180/68.5, 907, 908
See application file for complete search history.

(56) References Cited

U.S. PATENT DOCUMENTS

| | | | |
|---|---|---|---|
| 2,978,053 A | 4/1961 | Schmidt ................... 180/12 |
| 3,437,164 A | 4/1969 | Rabjohn .................. 180/68.5 |
| 3,708,028 A | 1/1973 | Hafer ..................... 180/65 R |
| 3,930,552 A * | 1/1976 | Kunkle et al. ............ 180/68.5 |
| 4,216,839 A | 8/1980 | Gould et al. ............. 180/65 R |
| 4,317,497 A | 3/1982 | Alt et al. ................. 180/68.5 |
| 4,570,739 A | 2/1986 | Kramer ................... 180/216 |
| 4,944,359 A | 7/1990 | Doman et al. |
| 4,967,864 A | 11/1990 | Boyer et al. ............. 180/65.1 |
| 5,042,607 A | 8/1991 | Falkenson et al. |
| 5,092,774 A | 3/1992 | Milan ..................... 439/66 |
| 5,125,849 A | 6/1992 | Briggs et al. ............. 439/378 |
| 5,150,762 A * | 9/1992 | Stegeman et al. ......... 180/208 |
| 5,151,855 A | 9/1992 | Gray et al. ............... 395/750 |
| 5,156,226 A | 10/1992 | Boyer et al. ............. 180/65.1 |
| 5,197,559 A | 3/1993 | Garin, III et al. ........ 180/65.1 |
| 5,291,959 A * | 3/1994 | Malblanc ................. 180/11 |

(Continued)

FOREIGN PATENT DOCUMENTS

DE    25 58 456    6/1977

(Continued)

*Primary Examiner*—Frank B Vanaman
(74) *Attorney, Agent, or Firm*—DLA Piper US LLP (57) ABSTRACT

A power supply assembly is provided for a vehicle, such as a Personalized Motorized Vehicle (PMV), including a detachable mounting assembly therefor which facilitates the ease of attachment of a Power Supply Unit (PSU) to a main structural frame of the vehicle, provides a positive electrical and structural connection therebetween, and integrates the power supply assembly with the external geometry of the vehicle to provide an aesthetically pleasing external appearance. The power supply assembly includes a pair of PSUs. A segment of one PSU unit overlaps a segment of another PSU unit and another segment of one PSU overlaps a portion of the main structural frame. Electrical connectors are disposed in combination with the overlapping housing segments for electrically coupling the PSUs and at least one PSU to the vehicle. The power supply, assembly, furthermore includes a retention subassembly for structurally connecting each PSU to the main structural frame.

7 Claims, 6 Drawing Sheets

U.S. PATENT DOCUMENTS

| | | | | |
|---|---|---|---|---|
| 5,351,774 | A | | 10/1994 | Okamoto |
| 5,522,734 | A | | 6/1996 | Goertzen .................... 439/500 |
| 6,095,270 | A | * | 8/2000 | Ishikawa ................... 180/68.5 |
| 6,170,592 | B1 | * | 1/2001 | Wu ............................. 180/208 |
| 6,564,893 | B2 | * | 5/2003 | Lipman ..................... 180/68.5 |
| 6,747,437 | B2 | * | 6/2004 | Chiu .......................... 320/107 |

FOREIGN PATENT DOCUMENTS

| | | |
|---|---|---|
| EP | 0 677 413 | 10/1995 |
| EP | 0 844 169 A | 5/1998 |
| GB | 1 569 967 A | 6/1980 |
| GB | 2 183 081 | 5/1987 |
| WO | WO 92/04200 | 3/1992 |

* cited by examiner

POWER SUPPLY ASSEMBLY FOR MOTORIZED VEHICLES

This present application claims priority from U.S. Provisional Patent Application No. 60/509,491, filed on Oct. 8, 2003.

TECHNICAL FIELD

The present invention relates to Power Supply Assemblies (PSAs) for Personalized Motorized Vehicles, and more particularly, to a new and useful detachable mounting assembly therefor which facilitates ease of attachment of a Power Supply Unit (PSU) to a main structural frame of the PMV, provides a positive electrical and structural connection therebetween, and integrates the power supply assembly with the external geometry of the PMV to provide an aesthetically pleasing external appearance.

BACKGROUND OF THE INVENTION

Personalized Motorized Vehicles (PMVs) have become increasingly popular in the past decade due, in great part, to the societal changes effected by the Americans with Disabilities Act (ADA) of June 1990. The ADA has, inter alia, effected sweeping changes to provide equal access and freedom of movement/mobility for disabled individuals. Notably, various structural changes have been mandated to the construction of homes, sidewalks, and even parkway/river crossings, e.g., bridges, to enlarge entrances and provide ramped surfaces to ease mobility for disabled persons in and around society.

Furthermore, electrically-powered PMVs offer an environmentally friendly alternative to gasoline burning vehicles such as gas-powered scooters, mopeds, motorcycles, etc. Finally, various technologies have made the mass production of such PMVs fiscally rewarding to manufacturers and affordable for the consumer. For example, the development of long-life rechargeable power supply units, e.g., lithium batteries, fuel cells, etc., has made PMVs practical for everyday use.

While significant advances have been made, there are still many design challenges/limitations which require innovation and improvement. One such area relates to the transportability of such PMVs within other vehicles for use at other destinations. Generally, the size and weight of such PMVs presents challenges, even for individuals of considerable strength and dexterity, to lift the PMV into an automobile or disassemble the PMV into manageable subassemblies. Some of the heavier subassemblies to manipulate include the power supply units, e.g., rechargeable batteries, which, individually, can weight in excess of twenty 20 pounds.

Conventionally, each battery is mounted to a floor pan of the PMV by means of a pair of long threaded rods disposed on opposite sides of a battery for clamping the battery to the floor pan. Each rod has a L-bracket at one end for engaging an upper surface of the power supply unit and a J-hook at the other end engaging a mounting aperture of the floor pan. Further, each L-bracket includes an aperture for engaging and sliding longitudinally along the rod. The rod is urged against the battery by a conventional wing-nut. Consequently, to remove the battery, the wing-nuts are loosened to disengage the L-brackets and the rods are displaced sufficiently to enable the battery to clear the brackets. Generally, each battery will include a strap extending across its top to facilitate handling of the battery. While this assembly provides a positive mounting arrangement for attaching the battery to the floor pan of the PMV (such positive mounting being especially critical for batteries subject to motion or vibration), this mounting arrangement does not facilitate rapid removal and reassembly.

Other mounting arrangements designed with such assembly/disassembly attributes, typically include a hook & rail assembly or a channel & track arrangement disposed along the upper side surfaces of a power supply unit. A typical hook & rail assembly may include, for example, J-shaped hooks disposed in combination with a battery/battery box for being hung on a pair of parallel rails attached to and supported by the PMV frame. As such, the battery/battery box may be installed vertically and relies upon its own weight to prevent the hooks from disengaging the rails. While this mounting arrangement facilitates ease of installation or disassembly, it does not positively retain the battery/battery box and, consequently, may not be suited for certain PMVs which experience vertical motion/acceleration, e.g. travelling upon rough terrain.

With respect to channel and track mounting arrangements, channels are formed in combination with the battery/battery box and engage tracks attached to the PMV frame. Installation and disassembly of the battery/battery box requires that the channels slideably engage the track by insertion of the channels through an open end of the track. As such the battery/battery box does not "drop in" vertically (possible with the hook & rail assembly discussed supra), but slides in horizontally. While the channels and track can be configured to positively engage and retain the battery/battery box, the mounting arrangement requires that space be provided for the battery/battery box to slide in a horizontal plane for engaging the track. Accordingly, this mounting arrangement may be unsuitable for PMVs wherein space is a design constraint.

In addition to the structural and/or functional disadvantages of the prior art, the battery/battery box and/or mounting assemblies therefor produce an aesthetically unattractive external appearance. Consequently, such components and assemblies are typically occluded or hidden from sight by a more aesthetically pleasing chassis element or PMV component. For example, a contoured external fuselage or a seat/seat support assembly may be disposed over the battery/battery box to preclude viewing of the battery/battery box and/or mounting arrangement. Consequently, these elements or assemblies must be additionally removed to access and disassemble the battery/battery box.

A need, therefore, exists for an assembly which positively mounts a power supply unit to a base frame support, facilitates rapid disassembly/reassembly of the power supply unit from the base frame support, and produces an aesthetically pleasing external appearance.

SUMMARY OF THE INVENTION

A power supply assembly is provided for a Personalized Motorized Vehicle (PMV) including a detachable mounting assembly therefor which facilitates the ease of attachment of a Power Supply Unit (PSU) to a main structural frame of the PMV, provides a positive electrical and structural connection therebetween, and integrates the power supply assembly with the external geometry of the PMV to provide an aesthetically pleasing external profile. The power supply assembly includes a pair of PSUs, each unit having a housing structure which includes at least one segment projecting from a center body portion thereof. A segment of one PSU unit overlaps a segment of another PSU unit and another segment of one PSU overlaps a portion of the main structural frame. Electrical connectors are disposed in combination with the overlapping housing segments for electrically coupling the PSUs and at least one PSU to the PMV.

The power supply assembly, furthermore, includes a retention subassembly for structurally connecting each PSU to the main structural frame. More specifically, the retention subassembly comprises a base support for accepting a power supply unit and having retention walls for in-plane retention of the power supply unit, an aperture disposed in the housing structure and a latching mechanism engaging the aperture for vertically retaining the power supply unit.

The power supply units produce a geometrically blended external profile when the housing structures are juxtaposed. Furthermore, the handle of the latching mechanism is externally accessible and geometrically blends with the external contour of the main structural frame.

BRIEF DESCRIPTION OF THE DRAWINGS

For the purpose of illustrating the invention, there is shown in the drawings various forms that are presently preferred; it being understood, however, that this invention is not limited to the precise arrangements and constructions particularly shown.

DETAILED DESCRIPTION OF THE DRAWINGS

Figure 1:
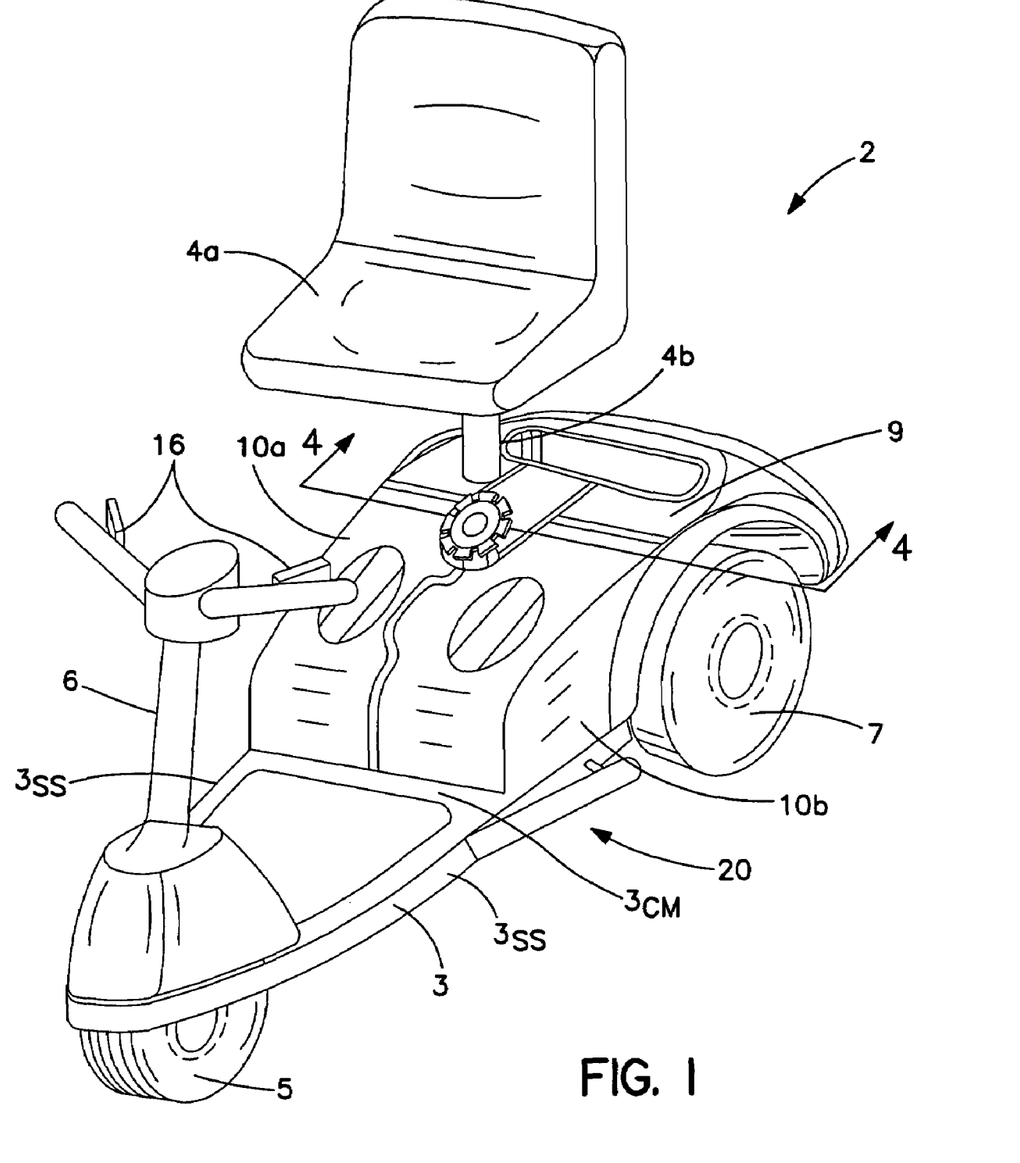
FIG. 1 is a perspective view of a Personalized Motorized Vehicle (PMV) employing a Power Supply Assembly (PSA) according to the present invention.

Referring now to the drawings wherein like reference numerals identify like elements, components, subassemblies etc., FIG. 1 depicts a Personalized Motorized Vehicle (PMV) 2 including a Power Supply Assembly (PSA) 20 according to the present invention. In the described embodiment, the PMV 2 is a three-wheeled scooter having a main structural frame 3, a seat 4a, a seat support stanchion 4b (raised relative to the main body), a front wheel 5 disposed in combination with a steering column 6, a pair of aft wheels 7 (only one being shown in the perspective view), a contoured chassis 9, and a pair of Power Supply Units (PSU) 10a, 10b, e.g., batteries. The main structural frame 3 includes a forward frame portion for mounting the steering column 6, an aft frame portion for mounting the aft wheels 7, side supports $3_{SS}$ for structurally interconnecting the forward and aft frame portions, and at least one cross member $3_{CM}$ for structurally interconnecting the side frame supports $3_{SS}$. A drive train assembly (not shown) is disposed aft of the seat 4a and includes a high torque electric motor for driving the aft wheels 6 through a reduction gearbox. The PMV 2 is operated by conventional throttle controls 16 disposed on the steering column 8 for issuing commands to a controller (not shown) through a power distribution system (e.g., wiring harnesses) for providing electric power to the PMV 2.

The PSA 20 comprises elements which effect electrical continuity between one of the PSU 10a, 10b and electrical systems/harnesses of the PMV 2, continuity between one of the PSU 10a, 10b and a charging unit, or continuity between two or more PSUs 10a, 10b. The PSA 20 comprises the elements which are interposed between the frame 3 and at least one of the power supply units 10a, 10b and functions to secure the power supply units 10a, 10b to the main structural frame 3. Additionally, the PSA 20 comprises elements which integrate one of the PSUs 10a, 10b within or to the contoured chassis 9. Further, in the context used herein, the main structural frame 3 is defined to include any structural element rigidly affixed or stationary with respect to the frame 3. Hence, portions of the contoured chassis 9 may be viewed as sub-elements of the main structural frame 3. Further, a PSU is defined to include elements which are integral with the PSU or, elements which, for all intents and purposes, are permanently affixed to a PSU and only removed or disconnected for repair and/or maintenance. Hence, a battery box or container, which houses a battery and contains the necessary electrical connections therebetween, is also part of the PSU 10.

Figure 2:
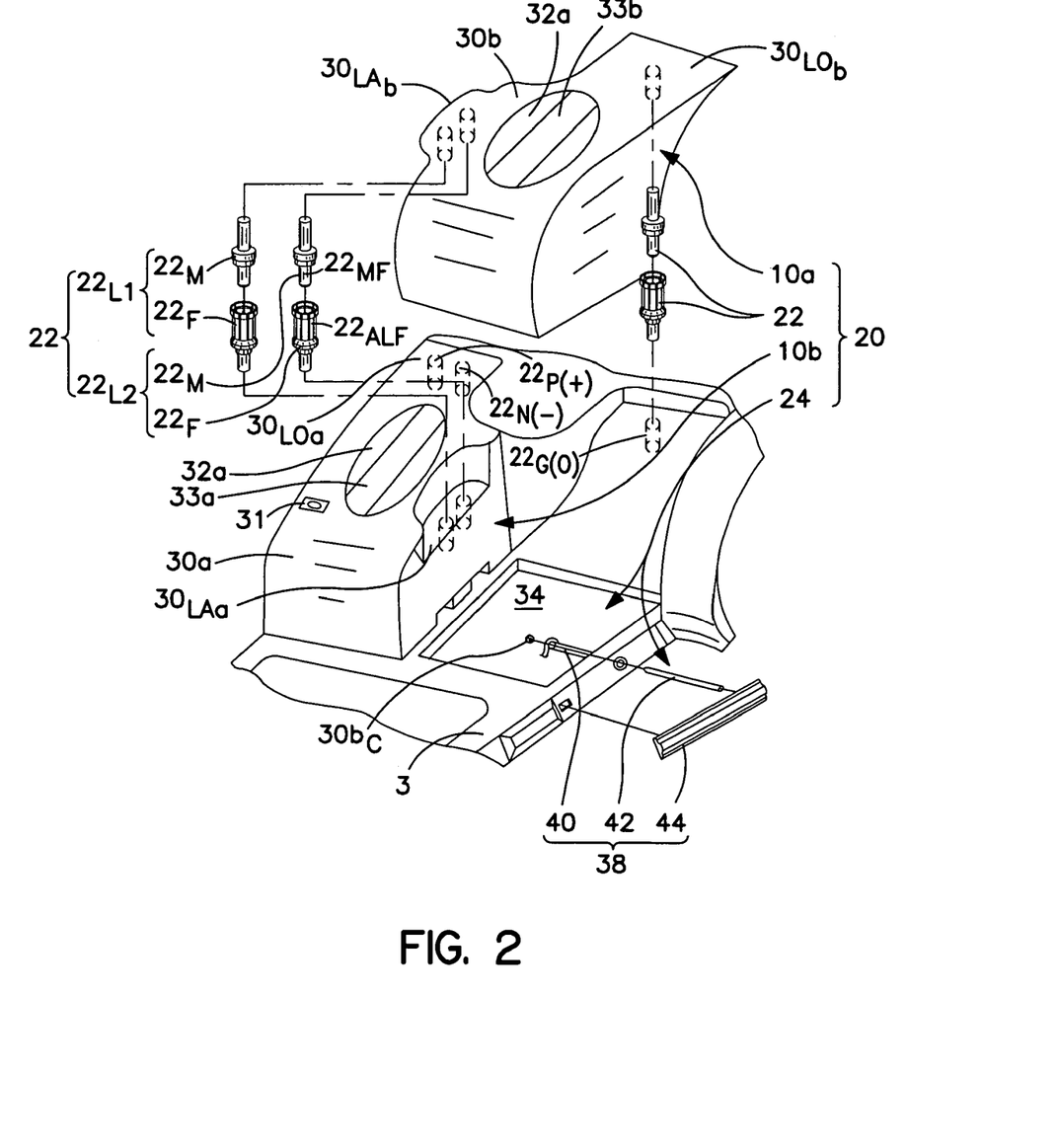
FIG. 2 is an exploded view of the relevant components of the PSA including electrical connectors, a retaining subassembly, and a pair of Power Supply Units (PSU).

In the preferred embodiment and referring to FIG. 2, the Power Supply Assembly 20 comprises (i) the Power Supply Units 10a, 10b, (ii) electrical connectors 22 for establishing electrical connections between: (i)(a) PSU 10a and PSU 10b, and (i)(b) one of the PSUs 10a, 10b and the PMV 2, and (ii) a retention subassembly 24 for positively engaging the PSUs 10a, 10b relative to the frame 3. Each of the principle elements of the PSA 20, i.e., the electrical connector 22 and retention subassembly 24, will be discussed in greater detail in the subsequent paragraphs.

Figure 3A:
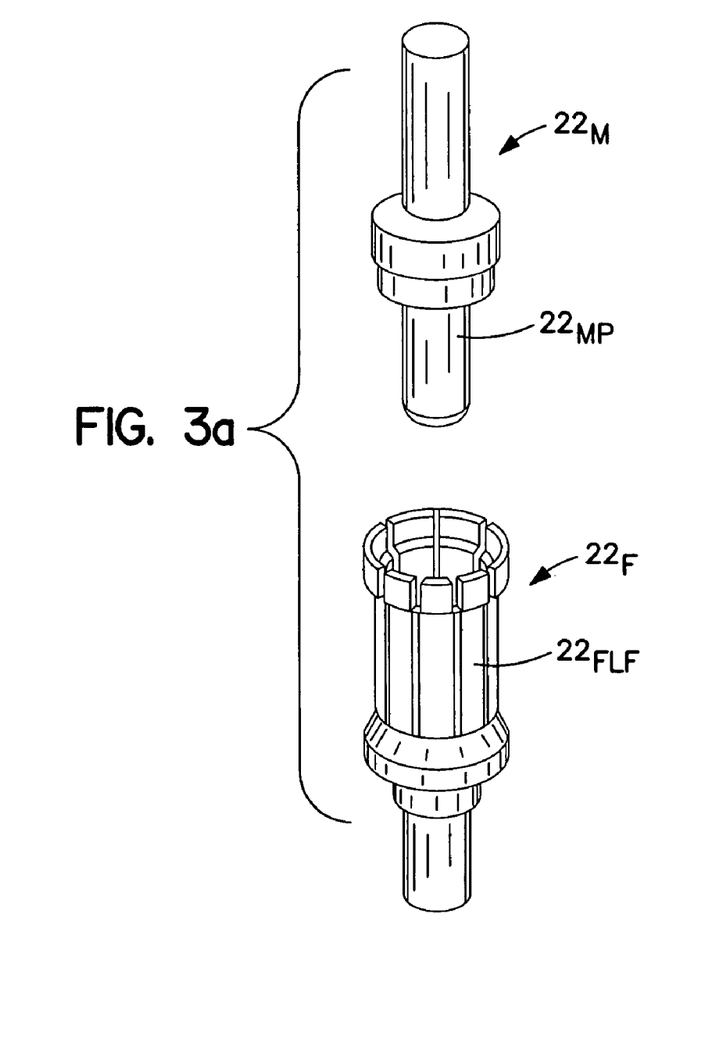
FIG. 3a is an enlarged view isolated view of the male and female contacts of an electrical connector employed in the PSA of the present invention.
Figure 3B:
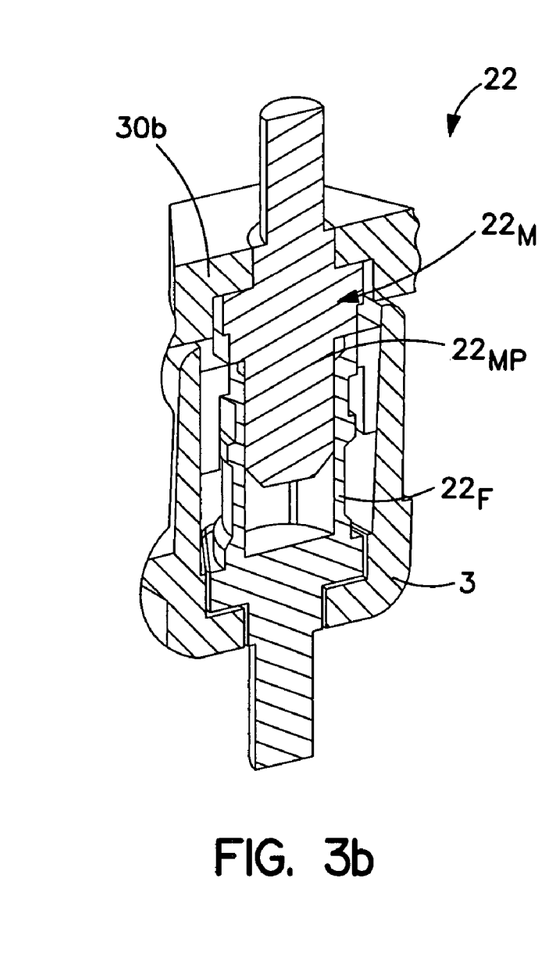
FIG. 3b is a cross sectional view all of an assembled connector employed in the PSA of the present invention.
Figure 4:
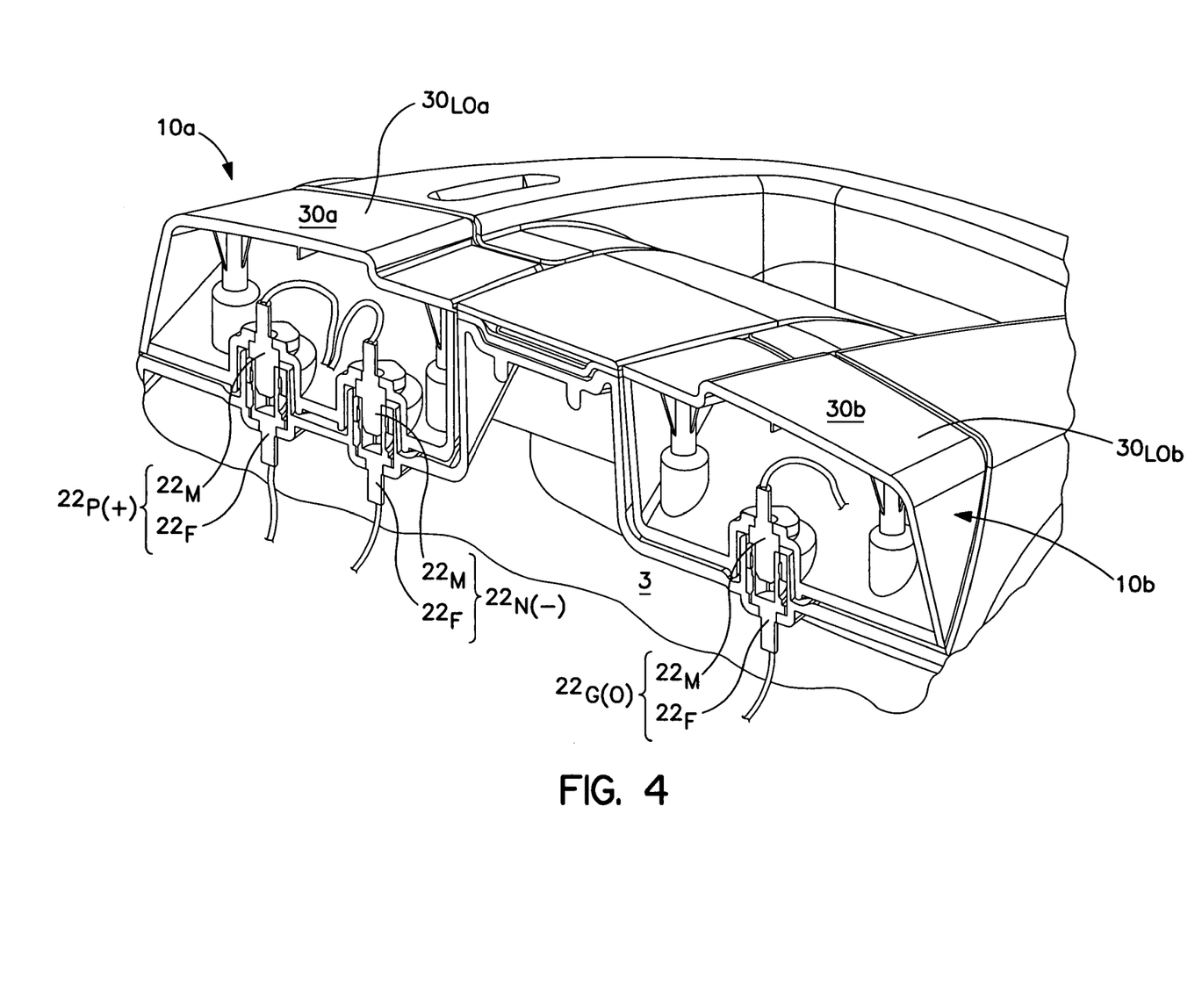
FIG. 4 is a cross the sectional view of taken substantially along line 4-4 of FIG. 1.

In the exploded and cross sectional views of FIGS. 3a, 3b, and 4, respectively, each of the PSUs 10a, 10b includes a housing structure 30a, 30b, portions of which project from the center body portion, to support and facilitate alignment of the electrical connectors 22. More specifically, each of the PSU 10a, 10b includes laterally projecting/recessing housing segments $30_{LA}$, one such segment $30_{LAa}$ geometrically interlocking with the other segment $30_{Lab}$, to effect an electrical connection between the PSUs 10a, 10b. In the described embodiment, the segments $30_{LAa}$, $30_{LAb}$ are juxtaposed in relation to the segments $30_{LAa}$, $30_{Lab}$, of the opposed housing structure 30a, 30b. Further, the segments $30_{LAa}$, $30_{Lab}$ overlap such that relative vertical displacement of the PSUs 10a, 10b will effect electrical engagement of the contacts $22_{L1}$, $22_{L2}$. That is, the male contacts $22_M$ of the electrical connectors $22_{L1}$, $22_{L2}$ are disposed in combination with the upper overlapping segment $30_{LAa}$ while female contacts $22_F$ are disposed in combination with the lower overlapping segment $30_{LAb}$. In the context used herein, the term "overlapping" means that the segments $30_{LAa}$, $30_{LAb}$ and their respective connectors $22_M$, $22_F$ define a substantially horizontal mating plane.

In FIGS. 2-4 each male contact $22_M$ includes a vertically oriented cylindrical post $22_{MP}$ (best seen in FIG. 3a) and each female contact $22_F$ includes an cylindrical array of longitudinal fingers $22_{FLF}$. As a male contact $22_M$ makes contact with a female contact $22_F$, the cylindrical array of fingers $22_{FLF}$ spread to accept the post $22_{MP}$ (i.e., the long slender shape of fingers effects a series of cantilever springs which spread and capture the post $22_{MP}$).

In addition to the electrical connectors $22_{L1}$, $22_{L2}$ for electrically coupling the juxtaposed PSUs 10a, 20b, three (3) primary electrical connectors $22_{P(+)}$, $22_{N(-)}$, $22_{G(0)}$ are made between the PSUs 10a, 10b and the main structural frame 3. That is, a positive (+), negative (−), and ground (0) connection are made to provide power to the drive train assembly and/or other PMV components requiring electric power. In the described embodiment, the PSU housing structures 30a, 30b include longitudinally projecting segments $30_{LOa}$, $30_{LOb}$ for supporting and mounting the primary electrical connectors $22_{P(+)}$, $22_{N(-)}$, $22_{G(0)}$ for powering the PMV 2. Similar to the lateral segments $30_{LAa}$ $30_{LAb}$, the longitudinal segments $30_{LOa}$, $30_{LOb}$ may also be viewed as overlapping with respect to the underlying main structural frame 3. In the described embodiment, the positive and negative contacts $22_{P(+)}$, $22_{N(-)}$ are mounted in combination with one of the PSUs 10a while the ground contact $22_{G(0)}$ is mounted in combination with the other of the PSUs 10b. While not an element of the mounting/installation assembly 20, at least one of the PSUs 10a may include an electrical port 31 for recharging the PSUs 10a, 10b. For recharging, the PSUs 10a, 10b are electrically coupled, i.e., coupled via lateral contacts $22_{L1}$, $22_{L2}$. This configuration also allows for the PSUs 10a, 10b to be recharged while not attached to the PMV 2. PSUs 10a, 10b can be removed from the PMV 2, recoupled together, and recharged simultaneously as a unit via electrical port 31 while not attached to the PMV 2 using an external power source (e.g., battery charger coupled to a household electrical outlet).

In the Figures, it will be apparent that the housing structures 30a, 30b mate to form a geometrically blended external profile. In the context used herein, geometrically blended means that portions of the housing structures are contiguous and are substantially flush (i.e., no abrupt changes in the external geometry, e.g., steps) at the juncture of the housing structures 30a, 30b. For example, the overlapping segments $30_{LAa}$ $30_{LAb}$, form an interlocking ellipse (best seen in FIG. 1) wherein the visible portion of the housing segments, i.e., segment $30_{LAb}$, smoothly blends at the juncture of the housing structures 30a, 30b. Furthermore, the overlapping segments $30_{LOa}$, $30_{LOb}$ geometrically blend with the contoured chassis profile rearward of the PSA 20. Finally, recesses 32a, 32b are provided in the PSU housing structures 30a, 30b to facilitate flush mounting of handles 33a, 33b for mounting or removing the PSUs 10a, 10b into and out of position.

To maintain positive electrical continuity across the male and female contacts $22_M$, $22_F$ of the electrical connectors 22 and to prevent in-plane loads (i.e., longitudinal and lateral) from acting on the connectors 22, the retention subassembly 24 (FIG. 2) secures each of the PSUs 10a, 10b relative to the main structural frame 3. Inasmuch as each retention subassembly 24 is essentially identical (i.e., the mirror image) of the other, only one of the retention subassemblies 24 associated with the right-hand (from an occupant's perspective) PSU 10b will be described.

Figures 5, 8:
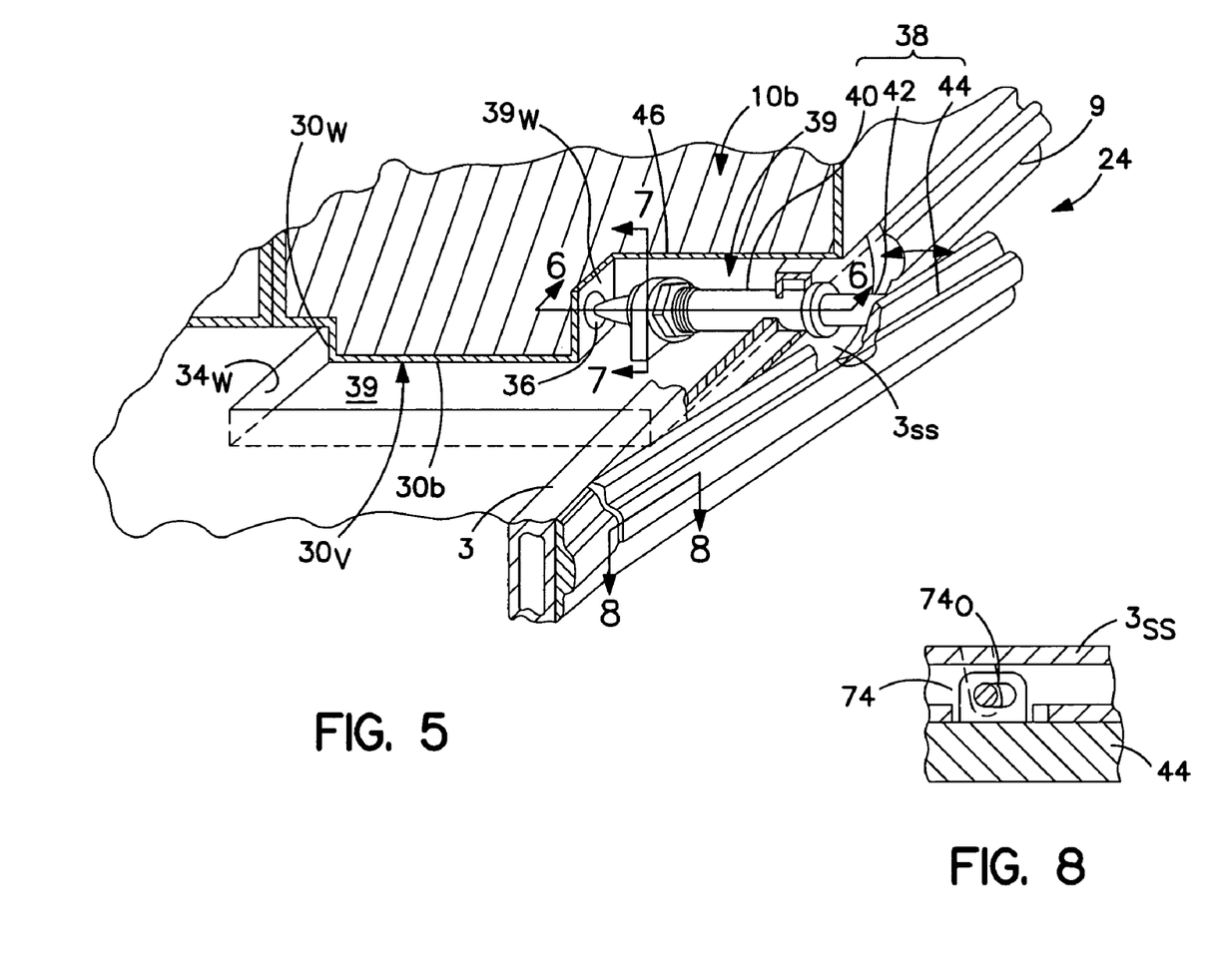
FIG. 5 is a partially broken away cross sectional view of the retention assembly according to the present invention.
FIG. 8 is a cross sectional view taken substantially along line 8-8 of FIG. 5.

In FIGS. 2 and 5, the retention subassembly 24 comprises a base support 34 for accepting the power supply unit 10b, an aperture 36 formed along the underside 30 of the PSU housing 30a, and a latching mechanism 38 for vertically retaining the power supply unit 10b relative to the base support 24. Before discussing the functional interaction of the various components of the retention subassembly 24, a brief description of the structural features of each will be provided to facilitate an understanding of its operation.

The support base 34 is disposed in combination with the main support frame 3 and configured to match the shape/mate with the PSU 10b. More specifically, the support base 34 defines vertical retaining walls $34_W$ which abut mating walls $30_W$ of the PSU housing 30b. The vertical walls $34_W$ are also tapered to align the PSU 10b upon installation.

Along the underside $30_U$ of the PSA housing 30b is a lateral channel 39 which forms a vertical wall $39_W$. The aperture 36 is disposed through the vertical wall $40_W$ and at a location which closely corresponds to the centroid $30b_C$ of the support base 34.

Figure 6:
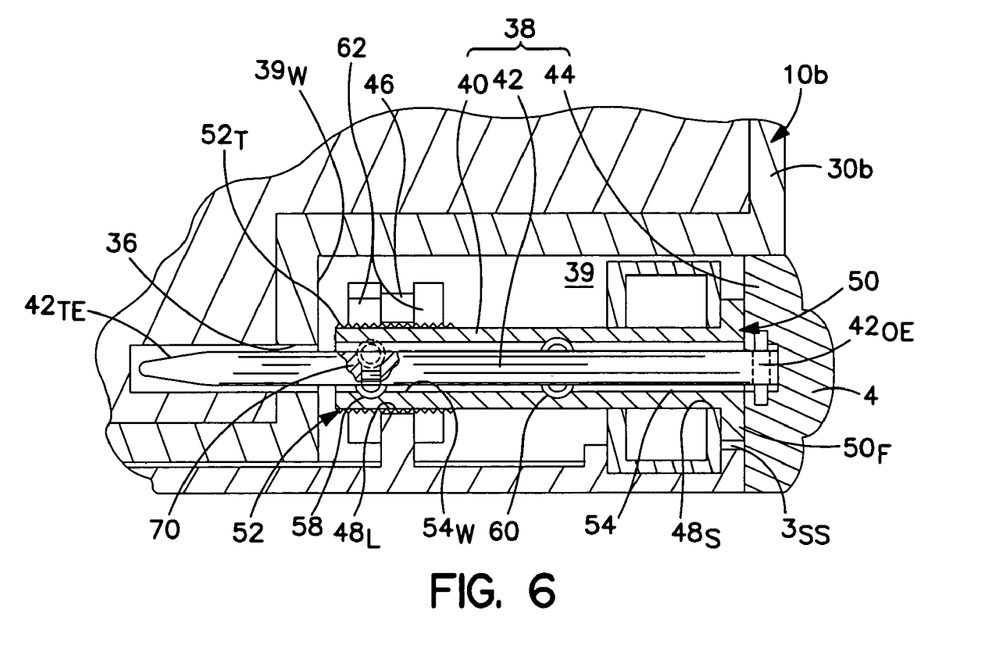
FIG. 6 is a cross sectional view taken substantially along line 6-6 of FIG. 5 depicting a pin engaging an aperture of a Power Supply Unit (PSU).
Figure 7:
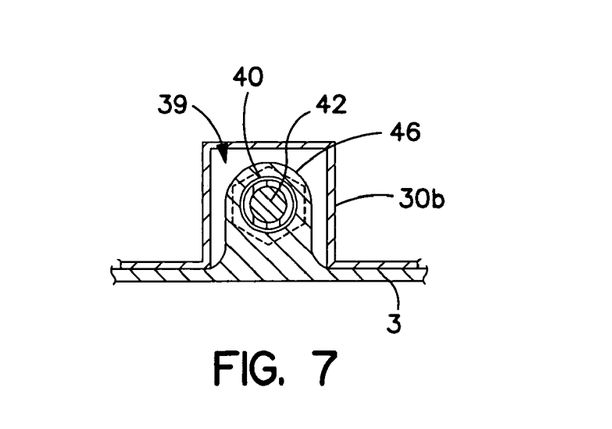
FIG. 7 is a cross sectional view taken substantially along line 7-7 of FIG. 5.

In FIGS. 5, 6 and 7, the latching mechanism 38 comprises a cylindrical sleeve 40 mounting to the main structural frame 3, a pin 42 disposed through the sleeve 40, and a handle 44 operative to displace the pin 42 within the sleeve 40. More specifically, the main structural frame 3 includes a lug 46 which in combination with the side support $3_{SS}$, define aligned apertures 48L and 48S, respectively. The apertures 48L, 48S accept and support the cylindrical sleeve 40 in a substantially horizontal plane. The cylindrical sleeve 40 has a flanged end 50, a threaded end 52, and a longitudinal bore 54 extending the length of the sleeve 40. Further, the cylindrical sleeve 40 includes first and second internal circular grooves 58, 60 formed along the internal wall $54_W$ of the bore 54. The grooves 58, 60 are spaced-apart and disposed between the flanged and threaded ends 50, 52 of the cylindrical sleeve 40. When assembled in combination with the frame 3, the flange $50_F$ of the sleeve 40 abuts the longitudinal side support $3_{SS}$, and the threads $50_T$ are disposed on each side of the lug 46. As such, a pair of nuts/washers 62 are employed to engage the threads $50_T$ and capture the lug 46 therebetween.

The pin 42 is disposed through the cylindrical bore 54 of the sleeve 40 and extends beyond each end 50 or 52 of the sleeve 40. More specifically, the pin 42 has an outboard end $42_{OE}$ which is pivotally mounted to the engagement handle 44 and a tapered inboard end $42_{TE}$ aligned with the aperture 36 along the underside $30_U$ of the PSU housing 30a. Further, the pin 42 includes a radially-biased ball catch 70 disposed between the inboard and outboard ends $42_{OE}$, $42_{TE}$.

Finally, in FIGS. 5, 6 and 8, the engagement handle 44 is pivotally mounted to the longitudinal side support $3_{SS}$ and pivots outboard, away from the PSU 10b, relative to the side support $3_{SS}$. Further, a pivot connection 74 (FIG. 8) between the handle 44 and the side support $3_{SS}$ includes an elongated aperture $74_O$ to allow both rotational and translational motion. This feature will be understood when discussing the operation of the handle 40. Further, the engagement handle 44 is disposed laterally outboard of the PSU 10b, and is externally accessible.

With respect to the operation of the PSA 20, (referring collectively to the Figures) the engagement handle 44 is positioned/rotated outwardly causing the pin 42 to traverse relative to the cylindrical sleeve 40. The pin 42 is recessed within the cylindrical sleeve 40 until the ball catch 70 aligns with and engages a first detent position created by the internal circular groove 58. The first detent position corresponds to a disengaged pin position which provides clearance for the housing structure 30b as it seats within the base support 34. More specifically, the first detent position ensures adequate clearance between the tapered end $42_{TE}$ of the pin 42 and the vertical wall $40_W$ which defines the aperture 36. The PSU 10b is then vertically lowered into the base support 34. As the PSU 10b is lowered, the tapered walls $34_W$ thereof align the PSU 10b relative to the main structural frame 3 and, simultaneously, align the male and female contacts $22_M$, $22_F$. While some downward force may be required, the weight of the PSU 10b will generally be sufficient to cause the posts $22_P$ of the male contacts $22_M$ to engage and spread the longitudinal fingers $22_{LF}$ of the female contacts $22_F$. As such, the requisite electrical connections are made.

Once fully seated, the aperture 36 of the PSU housing 30a will align with the tapered end $42_{TE}$ of the pin 42. The handle 44 is then rotated to effect linear displacement of the pin 42 to cause engagement thereof with the aperture 36. In view of the pure linear motion of the pin 42 within the cylindrical sleeve (i.e., the sleeve 40 being fixedly mounted to the frame), the pivot connection 74 must necessarily accommodate both rotational and translational motion. That is, the linear component of displacement caused by the arcuate motion of the handle 44 is accommodated by the elongate aperture $74_O$ of the pivot connection 74. When the handle 44 is fully engaged, the ball catch 70 is aligned with and engages a second detent position created by the internal groove 60. Furthermore, the handle 44 is flush with the external profile of the chassis 9.

The PSA assembly 20, therefore, effects all requisite electrical and structural connections by two simple movements. That is, all electrical connections are effected by a single downward (vertical) motion of the PSUs 10a, 10b while all structural connections are made by pivoting a handle 44 to effect pin engagement. With respect to the latter, the PSU 10a, 10b are retained laterally and longitudinally by the abutting walls $34_W$ of the base support 34 and retained vertically by the pin 42. As such, the retaining walls $34_W$ of the support base 34 react in-plane loads, i.e., principally in-plane inertial loads, acting on the PSU 10b, while the pin 42 and aperture 36 react vertical loads. Consequently, the electrical connectors 22 are essentially unloaded, thereby ensuring long-life and reliable service.

In addition to the positive electrical/structural connection effected by the PSA assembly 20, the accessibility and ease with which the handle 44 may lock or unlock the PSA 20 facilitates transport of the PMV 20 to alternate destinations. That is, both PSUs 10a, 10b can be removed without dismantling a chassis or frame as is typically required by prior art mounting assemblies.

Finally, it will be appreciated that the PSA assembly 20 provides an ability to blend functional and structural components, i.e., the electrical connectors 22, PSA housing 30a, 30b, engagement handle 44, into an aesthetically pleasing package. Furthermore, the PSA assembly 20 provides a "faired" contour for reducing aerodynamic drag of the vehicle and, consequently, improving performance.

In view of the foregoing, the present invention may be embodied in other specific forms without departing from the spirit or essential attributes thereof and, accordingly, reference should be made to the appended claims, rather than to the foregoing specification, as indicating the scope of the invention.

What is claimed is:

1. A power supply for a vehicle, the vehicle having a main structural frame for mounting one or more electrical components, the power supply assembly comprising:
   at least one pair of power supply units disposed in combination with the main structural frame, each unit having a housing structure, a segment of one power supply unit overlapping a segment of another power supply unit, and another segment of one power supply unit overlapping a portion of said main structural frame;
   electrical connectors disposed in combination with the overlapping housing segments for electrically coupling the power supply units;
   a retention subassembly comprising
      a base support for accepting at least one of the power supply units and having retention wall structures for in-plane retention of the power supply unit,
      said housing structure of at least one power supply unit comprising an aperture; and
      a latching mechanism engaging said aperture for vertically retaining the power supply unit in the base support; the latching mechanism comprising
         a cylindrical sleeve mounted to the main structural support and having a central bore extending the length of the cylindrical sleeve, the central bore having internal grooves defining first and second detent positions;
         a pin disposed within the central bore, said pin having an outboard end, a tapered inboard end aligned with said aperture, and a ball catch disposed therebetween; and
         a handle pivotally connected to and displacing the pin into and out of engagement with the housing aperture;
         said ball catch aligning with and engaging said internal grooves in response to a displacement of said pin, said first detent position corresponding to a disengaged position of said latching mechanism and said second detent position corresponding to an engaged position of said latching mechanism.

2. The power supply according to claim 1 further comprising an electrical port for connecting said pair of power supply units to an external power source for recharging.

3. The power supply according to claim 1 wherein each of the housing structures comprises a handle recess and an installation handle mounting to the housing structure, said installation handle extending across the handle recess in the respective housing structure for installing and removing the power supply unit from the respective base support.

4. A vehicle comprising:
   a front wheel disposed in combination with a steering column;
   a pair of aft wheels;
   a main structural frame having a forward frame portion for mounting said steering column, an aft frame portion for mounting said aft wheels, side supports for structurally interconnecting said forward and aft frame portions, and at least one cross member for structurally interconnecting said side supports;
   a seat support stanchion mounted to a cross member of said main structural frame;
   a system for distributing power to one or more electrical components;
   a power supply assembly disposed in combination with the cross member of said main structural frame and delivering power to said power distribution system, said assembly comprising a pair of juxtaposed power supply units, each unit having a housing structure, one of the power supply housing structures having a first segment overlapping a portion of a second power supply unit and a portion of at least one of the power supply units having a second segment overlapping a portion of the frame;
   a retention subassembly for vertically retaining each of the power supply units comprising
      a base support for accepting a power supply unit and having retention wall structures for in-plane retention of the power supply unit,
      each of said housing structures including an aperture, and
      a latching mechanism engaging said aperture, the latching mechanism comprising
         a cylindrical sleeve mounting to the main structural support and having a central bore extending the length of the cylindrical sleeve, the central bore having internal grooves defining first and second detent positions;

a pin disposed within the central bore, said pin having an outboard end pivotally mounted to said handle, a tapered inboard end aligned with said aperture, and a ball catch disposed therebetween; and a handle pivotally connecting to and displacing the pin into and out of engagement with the housing aperture;

said ball catch aligning with and engaging said internal grooves in response to a displacement of said pin, said first detent-position corresponding to a disengaged position of said latching mechanism and said second detent position corresponding to an engaged position of said latching mechanism.

5. The vehicle according to claim 4 wherein said power supply assembly is disposed forward of said seat support stanchion.

6. The vehicle according to claim 4 wherein said pair of power supply units further comprise an electrical port for connecting said pair of power supply units to an external power source for recharging.

7. A vehicle according to claim 4, wherein the first overlapping segment extends from a central portion of the one housing and the portion of the second power supply portion is formed as a recess for accepting the first overlapping segment, the first overlapping segment and the recess portion being in vertical alignment for vertically retaining the second power supply housing when the housing structures are mated together;

wherein the one power supply unit is electrically connected to the second power supply unit through electrical connections contained in the first overlapping segment and the recess in the second housing structures; and wherein the second power supply unit is electrically connected to the vehicle through electrical connectors contained in a second overlapping segment on one of the housings.

* * * * *